US 8,755,619 B2
Jun. 17, 2014

(12) United States Patent
Choi et al.

(10) Patent No.: US 8,755,619 B2
(45) Date of Patent: Jun. 17, 2014

(54) METHOD AND APPARATUS FOR ENCODING AND DECODING IMAGE DATA USING RUN OF THE IMAGE DATA

(75) Inventors: Dai-Woong Choi, Seoul (KR); Jung-Woo Kim, Seoul (KR); Sung-Bum Park, Seongnam-si (KR); Jae-Won Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 673 days.

(21) Appl. No.: 12/950,163

(22) Filed: Nov. 19, 2010

(65) Prior Publication Data
US 2011/0116721 A1 May 19, 2011

(30) Foreign Application Priority Data

Nov. 19, 2009 (KR) .................. 10-2009-0112272
Jun. 21, 2010 (KR) .................. 10-2010-0058673

(51) Int. Cl.
*G06K 9/46* (2006.01)
(52) U.S. Cl.
USPC ........................................... 382/245
(58) Field of Classification Search
None
See application file for complete search history.

(56) References Cited

U.S. PATENT DOCUMENTS

| 7,308,150 | B2 * | 12/2007 | Yokose ................... 382/245 |
| 7,454,073 | B2 * | 11/2008 | Chen et al. ............. 382/239 |
| 7,751,633 | B1 * | 7/2010 | Mukherjee ............. 382/239 |
| 8,121,427 | B2 * | 2/2012 | Tian et al. .............. 382/245 |
| 8,175,401 | B2 * | 5/2012 | Taniguchi et al. ...... 382/245 |
| 8,254,700 | B1 * | 8/2012 | Rastogi ................... 382/232 |
| 2002/0034331 | A1 * | 3/2002 | Miura ..................... 382/239 |
| 2002/0061141 | A1 * | 5/2002 | Kobayashi ............. 382/233 |
| 2004/0071356 | A1 * | 4/2004 | Sudharsanan et al. .. 382/244 |
| 2005/0068551 | A1 * | 3/2005 | Eldridge et al. ........ 358/1.9 |
| 2005/0169364 | A1 * | 8/2005 | Singh ..................... 375/240 |
| 2005/0232501 | A1 * | 10/2005 | Mukerjee ............... 382/239 |
| 2007/0116267 | A1 * | 5/2007 | Speirs et al. ........... 380/28 |
| 2008/0107174 | A1 * | 5/2008 | Roman .................. 375/240.02 |
| 2009/0022413 | A1 * | 1/2009 | Singh ..................... 382/244 |
| 2009/0060026 | A1 * | 3/2009 | Park et al. ............. 375/240.01 |
| 2009/0067733 | A1 * | 3/2009 | Ballerini ................. 382/237 |
| 2010/0027625 | A1 * | 2/2010 | Wik et al. .............. 375/240.12 |

OTHER PUBLICATIONS

Brahimi, Z.; Saadi, K.A.; Baraka, N., "A lossless image compression algorithm using variable block size segmentation," Industrial Electronics Society, 1998. IECON '98. Proceedings of the 24th Annual Conference of the IEEE, vol. 3, no., pp. 1471,1476 vol. 3, Aug. 31-Sep. 4, 1998.*

* cited by examiner

*Primary Examiner* — Atiba O Fitzpatrick
*Assistant Examiner* — Thomas A James
(74) *Attorney, Agent, or Firm* — Sughrue Mion, PLLC

(57) ABSTRACT

An encoding method includes selecting a run detection method in accordance with characteristics of image data, generating a run value by detecting a run that is repeated in the image data in accordance with the selected run detection method, generating run count bits by counting the number of repetitions of the detected run, and performing a run-length encoding using the detected run values and the run count bits. The run detection method includes a coefficient run detection method that detects a run based on pixel values, a pattern run detection method that detects the run based on whether the pixel blocks have a specified pattern, a difference run detection method that detects the run based on a difference value between two successive pixel values, and a residual run detection method that detects the run based on an error value that is a difference value between an actual pixel value and a predicted value.

24 Claims, 8 Drawing Sheets

METHOD AND APPARATUS FOR ENCODING AND DECODING IMAGE DATA USING RUN OF THE IMAGE DATA

CROSS-REFERENCE TO RELATED APPLICATIONS

This application claims the priority under 35 U.S.C. §119(a) of Korean Patent Application Nos. 10-2009-0112272 and 10-2010-0058673, filed in the Korean Intellectual Property Office on Nov. 19, 2009, and Jun. 21, 2010, respectively, the disclosures of which are hereby incorporated herein in their entireties by reference.

BACKGROUND

1. Field

The exemplary embodiments relate to a method and apparatus for encoding and decoding image data, and more particularly to a method and apparatus for encoding and decoding image data using a run of the image data.

2. Description of the Related Art

In general, in order to perform a lossless compression of image data, an entropy method is used. A representative example of the entropy method is a run-length coding method.

The run-length coding method is a coding method that compresses image data by processing the same pixel values as a run if the same pixel values are successively generated. In the case of using such a run-length coding in an image having a high resolution, more efficient compression of image data can be performed if the run is generated.

On the other hand, pixels that constitute image data may be repeated with a predetermined pattern. Particularly, in the case of image data for a printer, a facsimile, and the like, such a predetermined pattern is frequently formed. FIG. 1 is a diagram illustrating an example of image data composed of patterns. Referring to FIG. 1, the reference numeral "100" is composed of reference numerals "101" to "107". It can be seen that pixels constituting the reference numerals "101" to "107" have the same pixel structure.

Also, image data may have different patterns or run types in accordance with its characteristics. For example, in a background image in which pixel values are scarcely changed or a gradation image in which pixel values are successively and constantly changed, different types of patterns or runs may be generated. The run-length coding method in the related art performs the run-length coding without considering diverse characteristics of the image data.

SUMMARY

Accordingly, exemplary embodiments have been made to solve the above-mentioned aspects occurring in the related art, and the exemplary embodiment provides a method and apparatus for efficiently encoding and decoding image data.

Also, the exemplary embodiment provides a method and apparatus for encoding and decoding image data, which can recognize patterns of the image data and process pixels having duplicate patterns using a run.

Also, the exemplary embodiment provides a method and apparatus for encoding and decoding image data, which can select diverse run detection methods in accordance with the characteristics of the image data.

In accordance with an aspect of the exemplary embodiment, there is provided a method of encoding image data, which includes the steps of analyzing the characteristics of image data and selecting a run detection method in accordance with the analyzed characteristics of the image data; detecting a run using data to be used for run detection in accordance with the selected run detection method; and performing a run-length coding in accordance with the detected run.

In accordance with another aspect of the exemplary embodiment, there is provided an apparatus for encoding image data, which includes a controller analyzing the characteristics of image data, selecting a run detection method in accordance with the analyzed characteristics of the image data, and outputting data to be used for run detection in accordance with the selected run detection method; a run detector detecting a run from the data to be used for the run detection in accordance with the selected run detection method; and a run-length encoder performing a run-length coding in accordance with the detected run.

In accordance with still another aspect of the exemplary embodiment, there is provided a method of decoding image data, which includes the steps of receiving reconstructed pixel data and run count bits; selecting a run detection method in accordance with the characteristics of the image data by analyzing at least one of the received reconstructed pixel data and the run count bits; detecting a run using data to be used for run detection in accordance with the selected run detection method; and performing a run-length decoding in accordance with the detected run.

In accordance with still another aspect of the exemplary embodiment, there is provided an apparatus for decoding image data, which includes a controller receiving reconstructed pixel data and run count bits, selecting a run detection method in accordance with the characteristics of the image data by analyzing at least one of the received reconstructed pixel data and the run count bits, and outputting data to be used for run detection in accordance with the selected run detection method; a run detector detecting a run using the data to be used for the run detection in accordance with the selected run detection method; and a run-length decoder performing a run-length decoding in accordance with the detected run.

Effects according to the configuration of the exemplary embodiment is as follows.

The encoding and decoding are performed by detecting patterns included in image data in the unit of a block and performing a run processing of the pixel patterns detected in the unit of a block, and thus the encoding efficiency is increased by 65% at maximum in comparison to the method in the related art. Accordingly, the image data processing speed can be increased. Also, the run encoding and decoding can be performed by selecting a run processing method that suits the characteristics of the corresponding image data among diverse processing methods, and thus the encoding and decoding efficiency can be heightened.

BRIEF DESCRIPTION OF THE DRAWINGS

The above and other aspects and features of the exemplary embodiment will be more apparent from the following detailed description taken in conjunction with the accompanying drawings, in which.

DETAILED DESCRIPTION OF THE EXEMPLARY EMBODIMENTS

Figure 1:
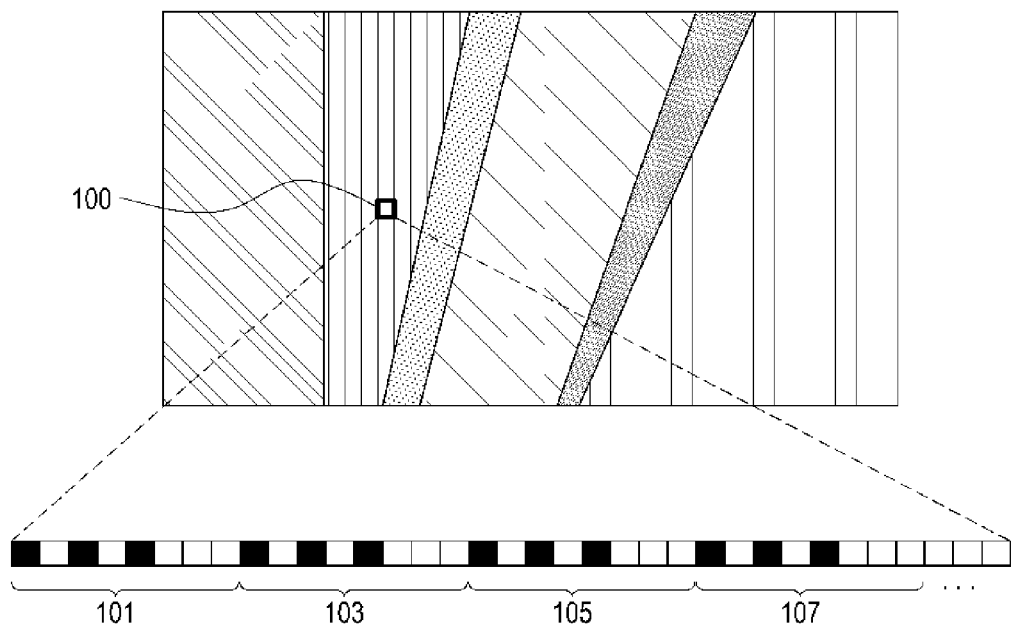
FIG. 1 is a diagram explaining an example of image data composed of a pattern.

Hereinafter, exemplary embodiments will be described with reference to the accompanying drawings. In the following description, the same elements will be designated by the same reference numerals although they are shown in different drawings. Further, a detailed description of known functions and configurations incorporated herein will be omitted when it may make the subject matter of the exemplary embodiment rather unclear.

According to the basic concept of the exemplary embodiment, an appropriate run-length method is selected in accordance with the characteristics of image data, a run value is generated by detecting a repeating run in the image data in accordance with the selected run detection method, run-length bits are generated by counting the number of repetitions of the detected run, and a run-length coding is performed using the detected run value and the run count bits. Also, the run detection method applied to the exemplary embodiment may be a coefficient run detection method that detects a run based on pixel values, a pattern run detection method that detects a run based on whether the pixel values of a pixel block form a specified pattern, a difference run detection method that detects a run based on a difference value between two successive pixel values, and a residual run detection method that detects a run based on an error value that is a difference value between an actual pixel value and a predicted value. Hereinafter, an exemplary embodiment will be described in detail.

Figure 2:
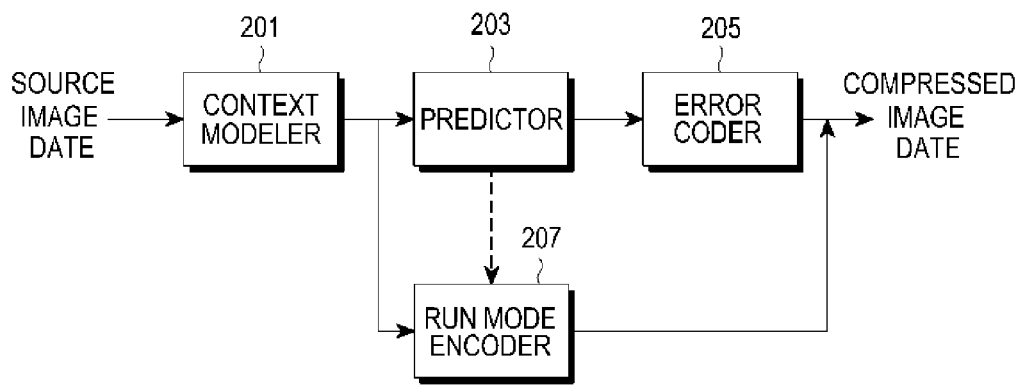
FIG. 2 is a diagram illustrating the configuration of an image encoding apparatus using a run-length coding method according to an exemplary embodiment.

FIG. 2 is a diagram illustrating the configuration of an image encoding apparatus using a run-length coding method according to an exemplary embodiment.

An encoder 200 includes a context modeler 201, a predictor 203, a run mode encoder 207, and an error encoder 205. The context modeler 201 performs a context modeling with respect to input source image data, and transfers the result of context modeling to the predictor 203 and/or run-mode encoder 207.

Generally, encoding of the image data is performed using a prediction encoding method. However, according to an exemplary embodiment, a run mode encoding method is used to efficiently encode the image data, and the prediction encoding method and the run-mode encoding method can be selectively used. That is, it is determined whether the run-mode encoding method or the prediction encoding method is appropriate in accordance with the characteristics of the image data, and one of the two methods can be selected accordingly. For example, if the image data has a lot of margin, it is frequent that the same pixels successively appear, and the run-mode encoding method is used with respect to the image data.

The predictor 203 performs encoding of the image data in accordance with the prediction encoding method. That is, the pixel value of the current pixel is predicted using neighboring pixels of the current pixel, a predicted value is determined, and the determined predicted value is encoded to output the encoded value to the error encoder 205. Also, the error value that is a difference value between the actual pixel value of the current pixel and the predicted value is output to the error encoder 205. The error encoder 205 encodes the error value, and outputs the encoded predicted value together.

The run mode encoder 207 performs a run-mode encoding in accordance with the run detection method according to an exemplary embodiment. The run detection methods provided according to an exemplary embodiment may be the coefficient run detection method that detects a run by comparing pixel values, the difference run detection method that detects the run using a difference value between the pixels, the residual run detection method that detects the run from error values between the actual pixel values and the predicted values, which are outputs of the predictor 203, and the pattern run detection method detects the same patterns among a plurality of pixel blocks. These methods will be described in detail later.

The run-mode encoder 207 analyzes the characteristics of the image data using data input to the run-mode encoder, selects the run detection method according to the analyzed characteristics, and detects a run according to the selected run detection method to generate a run value. Thereafter, the run-mode encoder 207 generates run count bits by counting the number of repetitions of the detected run, and performs the run-length encoding using the generated run value and the run count bits.

The number of run count bits may be predetermined. For example, it is assumed that the number of run count bits is 3. If the number of repeated runs is "3", the corresponding run count bits become "010". This is under the assumption that the run count of "1" corresponds to the run count bits of "000". The fact that the run count bits are set to 3 bits means that the pattern run can be processed 8 ($=2^3$) times at maximum. On the other hand, the number of run count bits may be changed in accordance with the characteristics of the image data and so on. However, in the following description, it is assumed that the number of run count bits is 3 for convenience in explanation.

The data input to the run mode encoder 207 is typically source image data that is an output of the context modeler 201. However, in the case where the run-mode encoder 207 selects the residual run detection method as the run detection method, it receives the error values transferred from the predictor 203, and detects the run using the transferred error value.

The configuration of the run mode encoder 207 will be described with reference to FIG. 4.

Hereinafter, the respective run detection methods according to exemplary embodiments will be described.

Figure 3A:
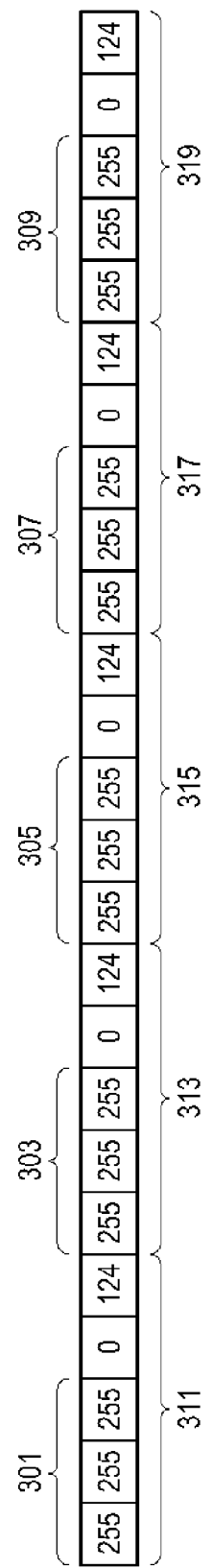
FIG. 3A is a diagram explaining a coefficient run detection method and a pattern run detection method according to an exemplary embodiment.

FIG. 3A is a diagram explaining a coefficient run detection method and a pattern run detection method according to an exemplary embodiment.

The coefficient run detection method will be explained with reference to reference numerals 301, 303, 305, 307, and 309.

It can be seen that the pixel value 255 is repeated three times in the reference numerals 301, 303, 305, 307, and 309. The coefficient run means that the successive pixels have the same pixel values.

The method of detecting the coefficient run and encoding the image data is as follows.

First, pixel values of the pixels of the reference numerals 301 and 302 are compared. If both have the same value, the coefficient run is detected. If the coefficient run is detected, the run count bits are generated by counting the number of repetitions of the run. In an example of FIG. 3A, the run value becomes 255, and the run count bit value becomes 1. During the run-length encoding using the run value and the run count bit, the pixel value "255" is encoded twice, and the count bit value "1" is encoded. The reason why the pixel value "255" is encoded twice is that the successive same pixel values should be encoded in all in order for the decoder to detect the run in the same method as the encoder.

On the other hand, the pattern run detection method will be described with reference to reference numerals 311, 313, 315, 317, and 319.

Referring to FIG. 3A, by making 5 pixel blocks in one unit, it can be seen that the pixel value patterns of the respective pixel blocks are the same. That is, the reference numerals 311, 313, 315, 317, and 319 have the same pixel patterns (255, 255, 250, 0, 124). The pattern run according to an exemplary embodiment means that the pixel blocks having a fixed size have the same pixel patterns in all.

Specifically, an example of the pattern run detection method is as follows.

First, the size of a pixel block for detecting the pattern, that is, the window size, is determined. Then, the two pixel blocks having the size corresponding to the window size are compared with each other. If the pixel values of the pixel blocks are not the same as a result of comparison, it means that the pattern is not detected, and the pattern detection is repeated with the window size re-determined. It is assumed that the window size is initially determined as "5" in an example of FIG. 3A. If the first pixel block 311 and the second pixel block 313 are compared, their pixel values are the same, and thus the pattern has been detected. Accordingly, run count bits are generated by counting the number of repetitions of the pattern in the following pixel blocks. In the case of performing the run-length coding in the above-described example, the run value is repeated twice and encoded, and the run count bits are encoded.

On the other hand, the repetition of the pattern detection may be repeated until the typical window size becomes "1". For example, the pixel pattern can be searched for by reducing the window size one by one, starting from "N" to "1". Here, in the case where the window size is "1", the same effect as that in the coefficient run detection method is obtained. However, the repetition of the pattern text until the current window size becomes "1" is merely exemplary, and the threshold value of the window size may be changed according to its design. For example, in the case of increasing the window size in an ascending order, the threshold value of the window size would be a value that is not "1".

The encoding efficiency according to the pattern run detection method is calculated as follows. It is assumed that 8 bits are necessary to encode one pixel and the run count bits are 3 bits. In this case, the size of the image data before the initial encoding operation becomes 200 bits (=25 pixels×8 bits). When the number of bits that are encoded according to the assumption is calculated, the size of the image data after the encoding is as follows. That is, the size of the image data becomes 83 bits (=the encoding of pixels of reference numerals 311 (8 bits×5=40 bits)+the encoding of pixels of reference numerals 313 (8 bits×5=40 bits)+the encoding of run count bits (3 bits)). The result of encoding efficiency according to the pattern run detection method will be additionally described with reference to FIG. 8 below.

On the other hand, in explaining the above-described pattern run detection method, it is exemplified that the pattern is detected by comparing two pixel blocks. However, according to circumstances, the pattern may be detected by comparing three or more pixel blocks. In this case, a prediction encoding method that performs prediction encoding among pixels constituting the respective pixel blocks may be used in combination.

Figure 3B:
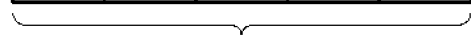
FIG. 3B is a diagram explaining a difference run detection method according to an exemplary embodiment.

FIG. 3B is a diagram explaining a difference run detection method according to an exemplary embodiment.

In FIG. 3B, it can be seen that differences between pixel values of the pixels in the reference numeral 321 are all "1". The difference run detection method detects a run if the differences between the pixel values of the pixels in the reference numeral 321 are the same in all. The difference run detection method is different from the coefficient run method on the points that the subject of comparison for the run detection is a difference value between two pixels.

Figure 3C:
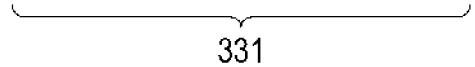
FIG. 3C is a diagram explaining a residual run detection method according to an exemplary embodiment.

FIG. 3C is a diagram explaining a residual run detection method according to an exemplary embodiment.

In FIG. 3C, for each pixel, an actual pixel value and an error value are indicated in parentheses. For example, in the first pixel, the pixel value is indicated as "255" and its error value is "2". Here, no special rule can be found between the actual pixel values of the pixels in the reference numeral 331. However, it can be seen that error values of the pixels in the reference numeral 331 are all "2". The residual run indicates such a case where the same error values are successively generated. The residual run detection method is different from the coefficient run method on the points that the subject of comparison for the run detection is an error value between the pixels.

As described above, the coefficient run, the pattern run, the difference run, and the residual run have been described. However, in relation to the pattern run, the modified method detects the pattern based on whether the pixel values have a predetermined pattern as shown in FIG. 3B. However, the pattern may be detected based on whether the difference values have a specified pattern as used in the difference run or whether error values used in the residual run form a predetermined pattern. As described above, the pattern run detection method can encode the image data using the pattern that is found in the image data on any basis.

Hereinafter, the operation of the run mode encoder 207 as described above with reference to FIG. 2 will be described in detail.

Figure 4:
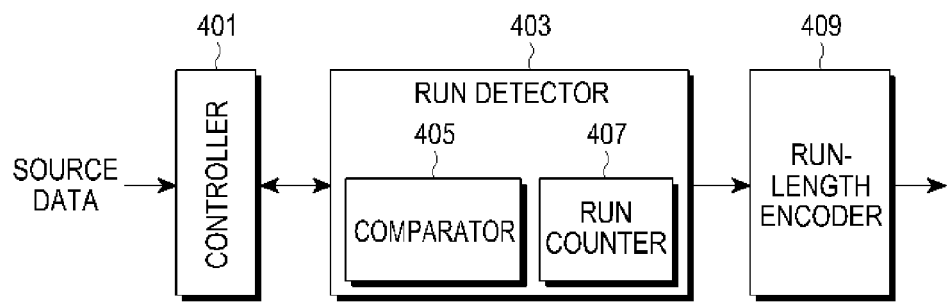
FIG. 4 is a diagram explaining an operation of a run mode encoder 207 of FIG. 2 according to an exemplary embodiment.

FIG. 4 is a diagram explaining the operation of the run mode encoder 207 of FIG. 2 according to an exemplary embodiment.

The run mode encoder 207 includes a controller 401, a run detector 403, and a run-length encoder 409.

The controller 401 receives source data, analyzes the characteristics of the image data, and selects a run detection method for the run detection according to the characteristics of the source data. That is, in accordance with the characteristics of the source data, at least one of the coefficient run detection method, the difference run detection method, the residual run detection method, and the pattern run detection method may be selected. As an example, if the image data corresponds to a smooth image as a result of analyzing the characteristics of the image data, the controller 401 selects the pattern run detection method. On the other hand, if the image data corresponds to a gradation image, the controller 401 selects the difference run detection method. If the image data corresponds to an angle image, the controller 401 selects the residual run detection method.

On the other hand, the controller 401 may select a plurality of run detection methods and determine the order in which they are performed. For example, the controller 401 may perform the run detection according to the coefficient run method and then perform the run detection according to the difference run method. Also, the controller 401 outputs data to be used for the run detection to the run detector 403 according to the selected run detection method.

If the coefficient run is selected, the controller 401 would directly output the pixel values to the run detector 403. Also, if the pattern run is selected, the controller 401 determines the window size for pixel blocks, and outputs the image data to the run detector 403 in the unit of a pixel block according to the determined window size. On the other hand, if the difference run is selected, the controller 401 calculates difference values between pixels, and outputs the calculated difference values to the run detector 403. If the residual run is selected, the controller 401 receives the error values by controlling the predictor 203 of FIG. 2 and outputs the error values to the run detector 403.

The run detector 403 includes a comparator 405 and a run counter 407. The comparator 405 detects the run by comparing input data from the controller 401 according to the selected detection method. That is, in the coefficient run method, the comparator 405 checks whether two successive pixel values coincide with each other, and in the pattern run method, the comparator 405 checks whether all pixel values of the two pixel blocks coincide with each other. Also, in the difference run method, the comparator 405 checks whether two successive difference values coincide with each other, and in the residual run method, the comparator 405 checks whether two successive error values coincide with each other. If they coincide with each other as a result of the comparison, the comparator 405 generates a run value and outputs the run value to the run-length encoder 409. If they do not coincide with each other, it means that no run is detected, and thus the comparator 405 informs the controller 401 that no run is detected. The controller 401, which has received information regarding the non-detection of the run, selects another run detection method, or interrupts the run mode encoding and performs a prediction encoding method.

On the other hand, the run counter 407 counts the run, generates and outputs run count bits to the run-length encoder 409. The run-length encoder 409 encodes the image data using the run values and the run count bits.

Figure 5:
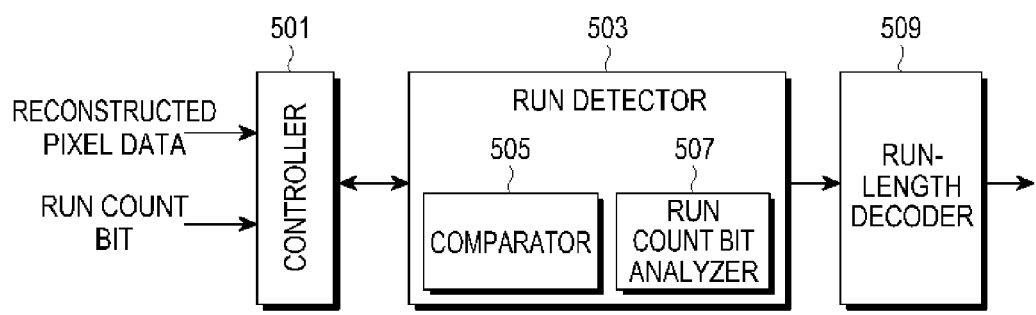
FIG. 5 is a diagram explaining a run mode decoding apparatus according to an exemplary embodiment.

FIG. 5 is a diagram explaining a run mode decoding apparatus according to an exemplary embodiment.

The run mode decoding apparatus according to an exemplary embodiment has a configuration corresponding to the run mode encoder 207. The detailed operation of the run mode decoding apparatus is as follows.

A controller 501 receives reconstructed pixel data and run count bits. The run count bits are transferred to a run detector 503. For reference, the reconstruction pixel data is pixel data that is received in correspondence to the pixel data encoded by the encoder. The controller 501 analyzes the characteristics of the image data using the reconstructed pixel data and/or the run count bits, and selects the run detection method for the run detection according to the characteristics of the image data. That is, the controller 501 selects at least one of the coefficient run detection method, the difference run detection method, the residual run detection method, and the pattern run detection method. The controller 501 may use another method except for the four run detection methods as described above. Also, in the case where a plurality of run detection methods is selected, the controller 501 may determine the order in which they are performed. For example, the controller 501 may perform the run detection according to the coefficient run method and then perform the run detection according to the difference run method. Also, the controller 501 outputs data to be used for the run detection to the run detector 503 according to the selected run detection method.

If the coefficient run is selected, the controller 501 would directly output the pixel values to the run detector 503. Also, if the pattern run is selected, the controller 501 determines the window size for pixel blocks, and outputs the image data to the run detector 503 in the unit of a pixel block according to the determined window size. On the other hand, if the difference run is selected, the controller 501 calculates difference values between pixels, and outputs the calculated difference values to the run detector 503. If the residual run is selected, the controller 501 receives the error values by controlling a predictor (not illustrated) and outputs the error values to the run detector 503. For reference, the predictor for the prediction decoding may be a configuration of a decoder that corresponds to the predictor 203 of FIG. 2.

The run detector 503 includes a comparator 505 and a run count bit analyzer 507. The comparator 505 detects the run by comparing input data from the controller 501 according to the selected detection method. That is, in the coefficient run method, the comparator 505 checks whether two successive pixel values coincide with each other, and in the pattern run method, the comparator 505 checks whether all pixel values of the two pixel blocks coincide with each other. Also, in the difference run method, the comparator 505 checks whether two successive difference values coincide with each other, and in the residual run method, the comparator 505 checks whether two successive error values coincide with each other. If they coincide with each other as a result of comparison, the comparator 505 generates a run value and outputs the run value to a run-length decoder 509. If they do not coincide with each other, it means that no run is detected, and thus the comparator 505 informs the controller 501 that no run is detected. The controller 501, which has received information regarding the non-detection of the run, selects another run detection method, or interrupts the run mode decoding and performs a prediction decoding method.

On the other hand, the run count bit analyzer 507 analyzes the run count bits and outputs the result of analysis to the run-length decoder 509. The run-length decoder 509 decodes the image data using the run values and the run count bits.

Figure 6:
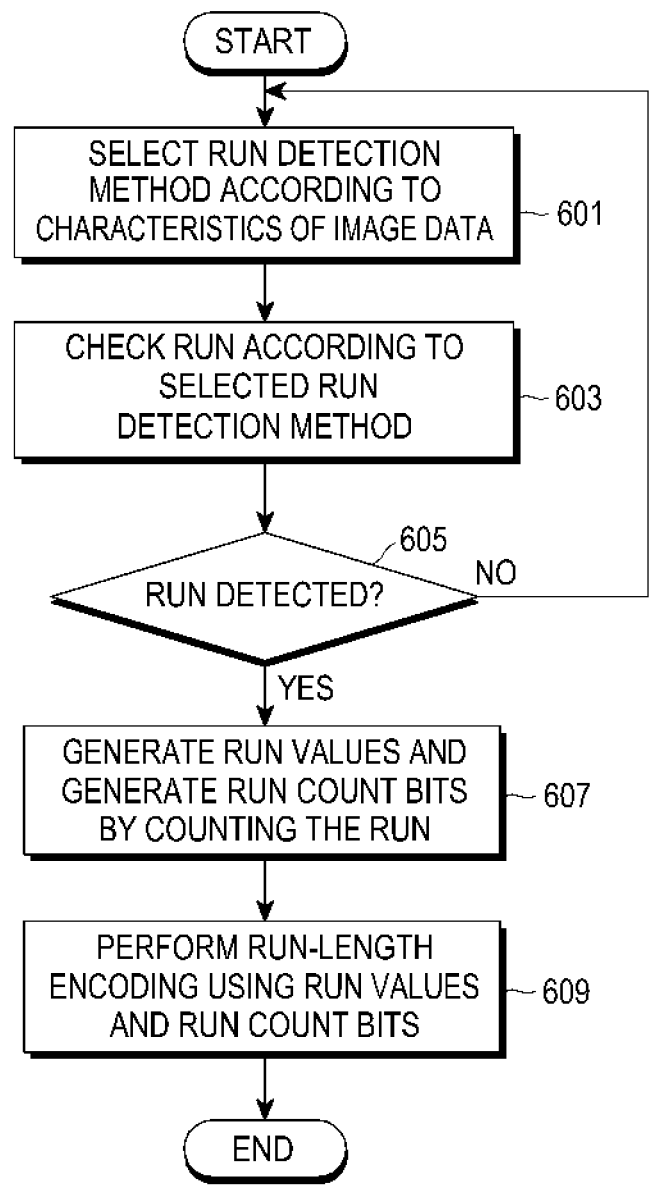
FIG. 6 is a diagram explaining a run-length encoding method according to an exemplary embodiment.

FIG. 6 is a diagram explaining a run-length encoding method according to an exemplary embodiment.

In step 601, the characteristics of the image data are analyzed, and the run detection method is selected according to the characteristics of the image data. In step 603, the run is checked according to the determined run detection method. Since the run detection methods proposed according to the exemplary embodiment have been described in detail with reference to FIG. 3, the detailed description thereof will be omitted. In step 605, if the run is detected, the run value is generated, and the run count bits are generated by counting the run. If the run is not detected, the processing returns to step 601, and another run detection method can be selected. Also, although not illustrated, the run mode encoding may be interrupted. In step 607, the run-length encoding is performed using the generated run values and run count bits.

Figure 7:
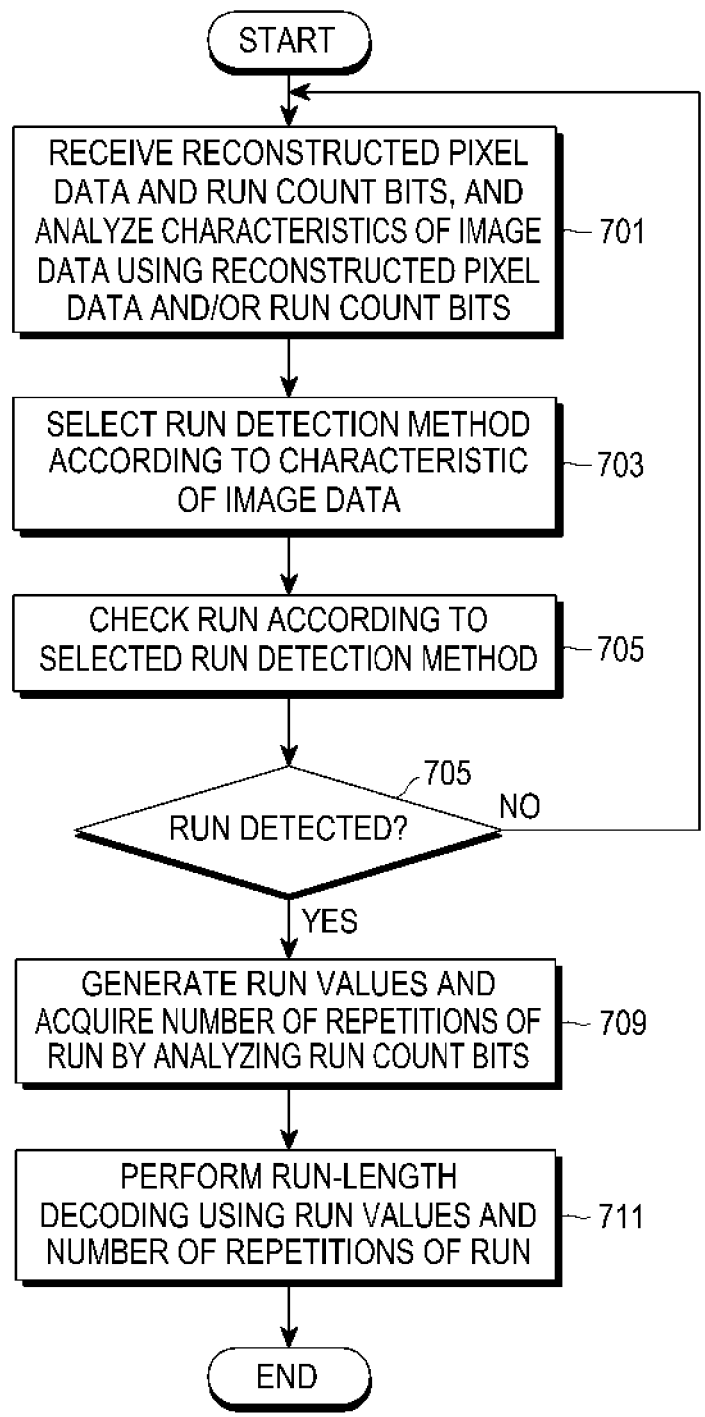
FIG. 7 is a diagram explaining a run-length decoding method according to an exemplary embodiment.

FIG. 7 is a diagram explaining a run-length decoding method according to an exemplary embodiment.

In step 701, the reconstructed pixel data and the run count bits are received. In step 703, the characteristics of the image data are analyzed using the reconstructed pixel data and/or the run count bits, and the run detection method is selected according to the characteristics of the image data. In step 705, the run is checked according to the determined run detection method. Since the run detection methods proposed according to the exemplary embodiment have been described in detail with reference to FIG. 3, the detailed description thereof will be omitted. If the run is detected in step 707, the run value of the detected run is generated, and the run count bits are generated by counting the run. If the run is not detected, the processing returns to step 701, and another run detection method can be selected. Also, although not illustrated, the run mode decoding may be interrupted. In step 709, the run-length decoding is performed using the generated run values and run count bits.

Figure 8:
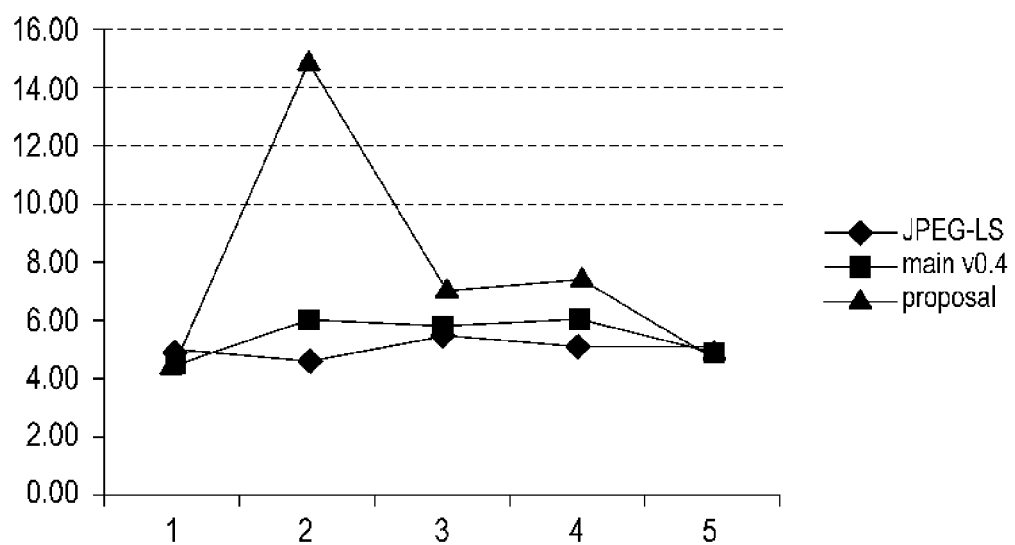
FIG. 8 is a diagram explaining the encoding efficiency of a pattern run-length encoding method according to an exemplary embodiment.

FIG. 8 is a diagram explaining the encoding efficiency of a pattern run-length encoding method according to an exemplary embodiment.

The reference numeral "801" denotes the encoding efficiency of a main v 0.4 encoding method, "803" denotes the encoding efficiency of a JPEG LS encoding method, and "805" denotes the encoding efficiency of the pattern run length encoding method according to the exemplary embodiment. As illustrated, it can be seen that the encoding efficiency of the pattern run length according to the exemplary embodiment is considerably high in comparison to the existing encoding method. As an example, the encoding method according to the exemplary embodiment has an improved gain by about 65% in comparison to the main v 0.4 encoding method.

Figure 9:
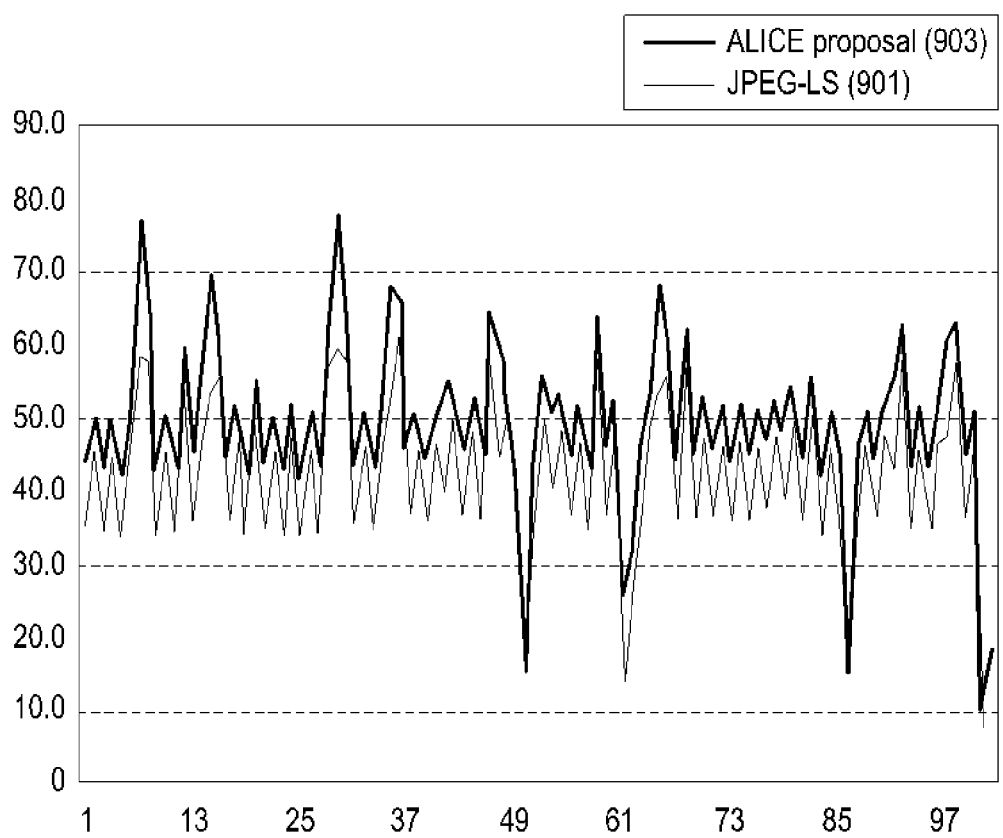
FIG. 9 is a diagram explaining the encoding efficiency of a pattern run-length encoding method according to an exemplary embodiment.

FIG. 9 is a diagram explaining the encoding efficiency of a run mode encoding apparatus of FIG. 4 according to an exemplary embodiment.

The reference numeral "901" denotes the encoding efficiency of a JPEG LS encoding method, and "903" denotes the encoding efficiency of the encoding method according to the exemplary embodiment. The JPEG LS encoding method shows the encoding efficiency of 31.26%, and the encoding method according to the exemplary embodiment shows the encoding efficiency of 44.62%. Accordingly, the encoding method according to the exemplary embodiment has an improved gain by about 43% in comparison to the JPEG LS encoding method.

Since a specified run is frequently generated in an image that is displayed on a monitor for a printer output, the exemplary embodiments can be efficiently applied to the decoding of the image data for the printer output. However, the exemplary embodiments are not limited thereto, and the exemplary embodiments can be applied to the encoding and decoding of all image data in which a specified run is generated. Also, in further extension, so far as a run is found in the field where the run-length encoding and decoding are used, the run-length encoding and decoding concept according to the exemplary embodiments could be applied thereto.

While the various aspects have been shown and described with reference to certain exemplary embodiments thereof, it will be understood by those skilled in the art that various changes in form and details may be made therein without departing from the spirit and scope of the exemplary embodiments as defined by the appended claims.

What is claimed is:

1. A method of encoding image data, the method comprising:
   analyzing characteristics of image data;
   selecting a run detection method based on the analyzed characteristics of the image data;
   detecting a run using data to be used for run detection based on the selected run detection method; and
   performing a run-length coding based on the detected run,
   wherein in response to the selected run detection method being a pattern run detection method, the detecting the run comprises detecting a pattern run from a plurality of pixel blocks, each of the pixel blocks having a same size, the pattern run indicating the plurality of pixel blocks all have the same pixel pattern.

2. The method as claimed in claim 1, wherein the selecting the run detection method selects at least one of a coefficient run detection method that detects the run based on pixel values, a difference run detection method that detects the run based on a difference value between two successive pixel values, and a residual run detection method that detects the run based on an error value that is a difference value between an actual pixel value and a predicted value.

3. The method as claimed in claim 1, wherein when the pattern run detection method is selected, the detecting determines the size of the pixel block to detect the pattern run based on the determined size of the pixel block, and if the pattern run is not detected based on the determined size of the pixel block, re-determine the size of the pixel block to re-detect the pattern run based on the re-determined size of the pixel block.

4. The method as claimed in claim 1, wherein the detecting the run comprises generating a run value by detecting the run by comparison of two successive data among data required for the selected run detection method, and generating run count bits by counting a number of repetitions of the detected run.

5. The method as claimed in claim 4, wherein the performing the run-length encoding performs the run-length encoding using the generated run values and the generated run count bits.

6. An apparatus for encoding image data, comprising a processor configured to analyze characteristics of image data, select a run detection method in accordance with the analyzed characteristics of the image data, and output data to be used for run detection based on the selected run detection method, implement a run detector which detects a run from the data to be used for the run detection based on the selected run detection method, and implement a run-length encoder which performs a run-length coding based on the detected run,
   wherein in response to the selected run detection method being a pattern run detection method, the run detector detects a pattern run from a plurality of pixel blocks, each of the pixel blocks having a same size, the pattern run indicating the plurality of pixel blocks all have the same pixel pattern.

7. The apparatus as claimed in claim 6, wherein the processor is configured to select at least one of a coefficient run detection method which detects the run based on pixel values, a difference run detection method which detects the run based on a difference value between two successive pixel values, and a residual run detection method which detects the run based on an error value which is a difference value between an actual pixel value and a predicted value.

8. The apparatus as claimed in claim 6, wherein the processor is configured to determine the size of the pixel block to detect the pattern run based on the determined size of the pixel block, and if the pattern run is not detected based on the determined size of the pixel block, re-determines the size of the pixel block to re-detect the pattern run based on the re-determined size of the pixel block.

9. The apparatus as claimed in claim 7, wherein when the difference run detection method is selected, the processor is configured to calculate the difference value between the two successive pixel values and outputs the calculated difference value to the run detector.

10. The apparatus as claimed in claim 7, wherein when the residual run detection method is selected, the processor is configured to calculate the error value transferred from a predictor which predicts the actual pixel value of the corresponding pixel, and outputs the error value to the run detector.

11. The apparatus as claimed in claim 6, wherein the run detector comprises:
   a comparator which generates a run value by detecting the run through comparison of two successive data among data required for the selected run detection method; and
   a run count generator which generates run count bits by counting a number of repetitions of the detected run.

12. The apparatus as claimed in claim 11, wherein the run-length encoder performs the run-length encoding using the generated run values and the generated run count bits.

13. A method of decoding image data, the method comprising:
   receiving reconstructed pixel data and run count bits;
   selecting a run detection method in accordance with characteristics of the image data by analyzing at least one of the received reconstructed pixel data and the run count bits;
   detecting a run using data to be used for run detection in accordance with the selected run detection method; and
   performing a run-length decoding in accordance with the detected run,
   wherein in response to the selected run detection method being a pattern run detection method, the detecting the run comprises detecting a pattern run from a plurality of pixel blocks, each of the pixel blocks having a same size, the pattern run indicating the plurality of pixel blocks all have the same pixel pattern.

14. The method as claimed in claim 13, wherein the selecting the run detection method selects at least one of a coefficient run detection method that detects the run based on pixel values, a difference run detection method that detects the run based on a difference value between two successive pixel values, and a residual run detection method that detects the run based on an error value that is a difference value between an actual pixel value and a predicted value.

15. The method as claimed in claim 13, wherein when the pattern run detection method is selected, the detecting the run determines the size of the pixel block to detect the pattern run based on the determined size of the pixel block, and if the pattern run is not detected based on the determined size of the pixel block, re-determines the size of the pixel block to re-detect the pattern run based on the re-determined size of the pixel block.

16. The method as claimed in claim 13, wherein the step of detecting the run comprises generating a run value by detecting the run through comparison of two successive data among data required for the selected run detection method, and generating run count bits by counting the number of repetitions of the detected run.

17. The method as claimed in claim 16, wherein performing the run-length decoding performs the decoding using the generated run values and the generated run count bits.

18. An apparatus for decoding image data, the apparatus comprising a processor configured to receive reconstructed pixel data and run count bits, select a run detection method based on the characteristics of the image data by analyzing at least one of the received reconstructed pixel data and the run count bits, and output data to be used for run detection based on the selected run detection method, implement a run detector which detects a run using the data to be used for the run detection based on the selected run detection method, and implement a run-length decoder which performs a run-length decoding based on the detected run,
   wherein in response to the selected run detection method being a pattern run detection method, the run detector detects a pattern run from a plurality of pixel blocks, each of the pixel blocks having a same size, the pattern run indicating the plurality of pixel blocks all have the same pixel pattern.

19. The apparatus as claimed in claim 18, wherein the processor is configured to select at least one of a coefficient run detection method which detects the run based on pixel values, a difference run detection method which detects the run based on a difference value between two successive pixel values, and a residual run detection method which detects the run based on an error value that is a difference value between an actual pixel value and a predicted value.

20. The apparatus as claimed in claim 18, wherein the processor is configured to determine the size of the pixel block to detect the pattern run based on the determined size of the pixel block, and if the pattern run is not detected based on the determined size of the pixel block, re-determines the size of the pixel block to re-detect the pattern run based on the re-determined size of the pixel block.

21. The apparatus as claimed in claim 19, wherein when the difference run detection method is selected, the processor is configured to calculate a difference value between the two successive pixel values and outputs the calculated difference value to the run detector.

22. The apparatus as claimed in claim 19, wherein when the residual run detection method is selected, the processor is configured to receive an error value transferred from a predictor which predicts the pixel value of the corresponding pixel, and outputs the error value to the run detector.

23. The apparatus as claimed in claim 18, wherein the run detector comprises:
   a comparator which generates a run value by detecting the run through comparison of two successive data among data required for the selected run detection method; and
   a run count generator which generates run count bits by counting the number of repetitions of the detected run.

24. The apparatus as claimed in claim 23, wherein the run-length decoder performs the decoding using the generated run values and the generated run count bits.

* * * * *